United States Patent [19]

Dethier et al.

[11] Patent Number: 5,152,338

[45] Date of Patent: Oct. 6, 1992

[54] HEAT EXCHANGER AND METHOD OF MAKING SAME

[75] Inventors: Vincent B. Dethier; William J. Gillette, II, both of Rochester, N.Y.

[73] Assignee: Eastman Kodak Company, Rochester, N.Y.

[21] Appl. No.: 775,870

[22] Filed: Oct. 15, 1991

[51] Int. Cl.[5] .......................... F28F 3/14; B29C 39/10
[52] U.S. Cl. ..................... 165/170; 165/47; 165/132; 264/263; 264/273; 354/299
[58] Field of Search ............. 165/168, 170, 132, 905, 165/47; 354/299; 264/263, 273

[56] References Cited

U.S. PATENT DOCUMENTS

| | | | |
|---|---|---|---|
| 2,705,617 | 4/1955 | Ekwall | 257/245 |
| 2,722,732 | 11/1955 | Sandberg | 29/157.3 |
| 2,752,129 | 6/1956 | Modine | 165/170 |
| 2,828,393 | 3/1958 | Wingard | 264/273 |
| 2,966,435 | 12/1960 | Kassinger | 264/263 |
| 3,000,088 | 9/1961 | Melzer | 29/421 |
| 3,056,189 | 10/1962 | Campbell | 29/157.3 |
| 3,459,875 | 8/1969 | Fork | 174/97 |
| 3,491,184 | 1/1970 | Rietdijk | 264/254 |
| 3,545,062 | 12/1970 | Cox | 29/157.3 |
| 3,611,904 | 10/1971 | Buechner | 354/299 |
| 3,983,934 | 10/1976 | Lee | 165/170 |
| 4,451,960 | 6/1984 | Militor | 29/157.3 |
| 4,456,355 | 6/1984 | Kaufmann et al. | 354/299 |
| 4,517,721 | 5/1985 | Graham | 29/157.3 |
| 4,951,927 | 8/1990 | Johnston et al. | 264/129 |

FOREIGN PATENT DOCUMENTS

| | | | |
|---|---|---|---|
| 1142334 | 1/1963 | Fed. Rep. of Germany . | |
| 58-145320 | 8/1983 | Japan . | |
| 149793 | 7/1986 | Japan | 165/170 |
| 1009332 | 11/1965 | United Kingdom | 165/905 |
| 1492408 | 11/1977 | United Kingdom . | |

Primary Examiner—John Rivell
Assistant Examiner—L. R. Leo
Attorney, Agent, or Firm—Frank Pincelli

[57] ABSTRACT

A heat exchanger comprising a conduit formed by two elongated channel forming sheets bound and sealed together along facing flat edges by encapsulating plastic extending around the edges of the sheets and extending through matching openings in the flat sheet edges. The encapsulation is preferably carried out as part of the reaction injection molding of a container, with the heat exchanger encapsulated in a wall of the container.

9 Claims, 1 Drawing Sheet

HEAT EXCHANGER AND METHOD OF MAKING SAME

This invention relates to a novel heat exchanger having a conduit made of sheet members forming a channel surrounded by facing, flat surfaces of both members. The flat surfaces have matching, spaced openings through which extends encapsulating plastic material to bind and seal said members together. The encapsulation may take place in forming, and as part of, a wall of a container.

THE PRIOR ART

The forming of heat exchangers by use of channel members is known, for example, in German DAS 142334 of 1963; British Patent 1,492,408 of 1977; and Japanese 58/145320(A) of 1983. In each disclosure binding together of channel forming members is by means of solder, welding or adhesive. Encapsulation is not disclosed.

According to the present invention, encapsulation causes plastic to flow through matching openings in facing, flat edge portions of the channel forming members, thereby to bind and seal them together. This is particularly useful, but is not limited to, use in encapsulating the heat exchanger in forming, and as part of, a wall of a container, as will be described in more detail herein.

THE DRAWING

FIG. 1 shows in perspective and with parts broken away for clarity, a heat exchanger in accordance with the invention, formed in the wall of a container.

DETAILED DESCRIPTION OF THE INVENTION

Figure 1:
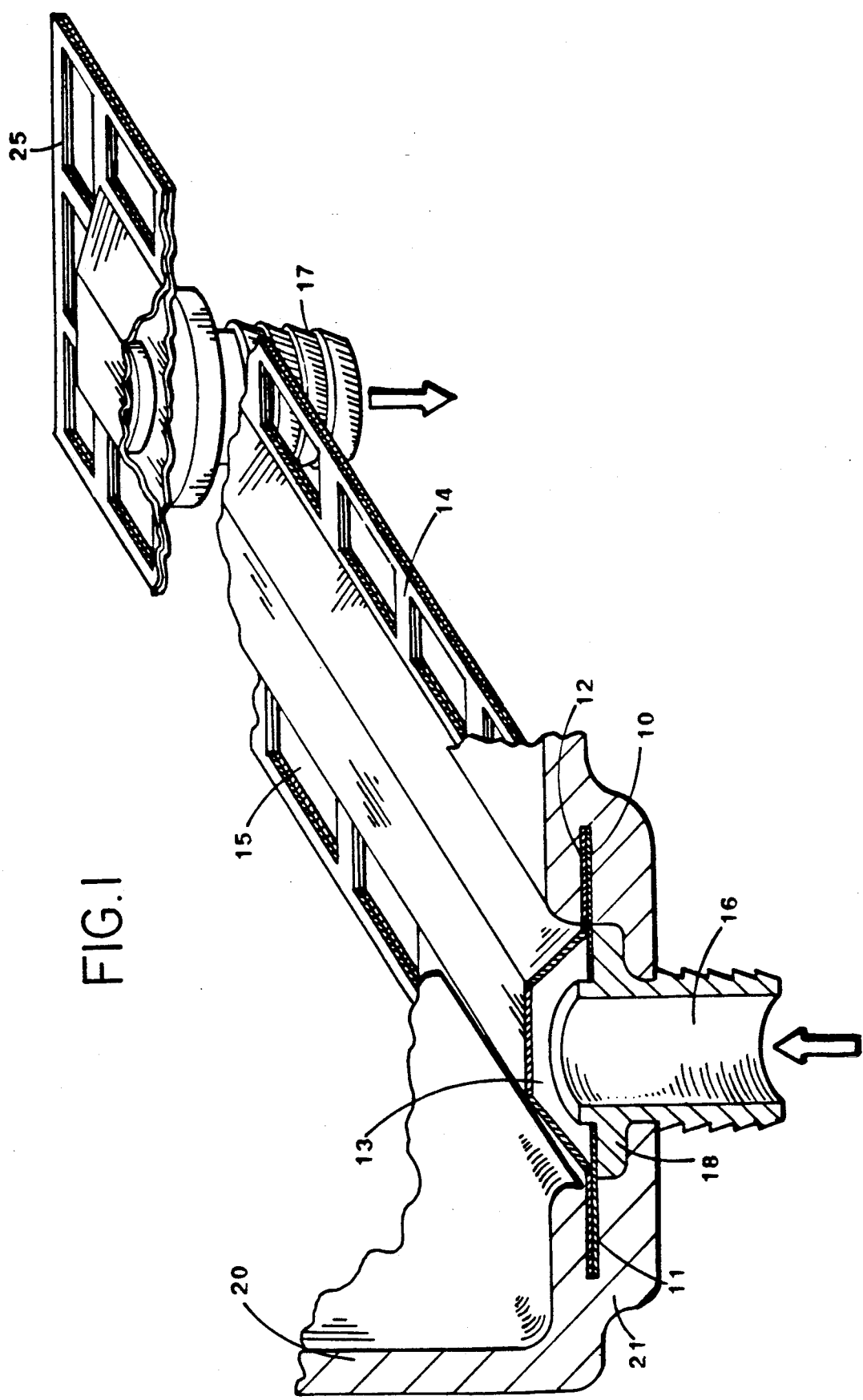

Referring to the drawing, a first sheet member of elongated peripheral configuration is shown at 10. This member, as shown, is flat, and in any event has flat edge portions extending around its entire periphery, as indicated at 11. A second member 12 of heat transmitting material has substantially the same elongated peripheral configuration as member 10, and has an elongated, channel forming concavity 13 surrounded by flat surfaces 14 which are positioned face to face with the flat edge portions 11 of member 10, the channel forming concavity 13 of member 12 facing toward member 10, so that the latter constitutes a wall of the channel, thus forming a conduit. Both members 10 and 12 are preferably of sheet metal of a type resistant to the effects of chemical solutions, for example, those used in photographic processes. If members 10 and 12 are of different materials, the materials should have substantially the same coefficient of expansion with temperature changes.

The facing flat edge portions 11 and 14 have spaced openings 15, with the openings in edge portions 11 aligned with those in edge portions 14.

In the respective end portions of member 10, barbed tube fittings 16 and 17 are pressed into holes in member 10 to form inlet and outlet connections into channel 13. Each fitting 16, 17 has an integral collar 18 which positions it against member 10 and holds it in place after the encapsulation, which will be described.

In forming members 10 and 12, after channel 13 has been formed by stamping or otherwise in member 12, the two members 10 and 12 are brought into facing relation as shown in the drawing, and the openings 15 are then punched out of both members at the same time. This tends to provide a temporary binding together of members 10 and 12 due to the small extrusions of metal pushed along the openings by the punching operation.

A novel and useful heat exchanger is formed by encapsulating the channeled device described above, that is, by flowing a settable plastic material around the facing edge portions 11 and 14 so that the material flows through holes 15 as well as around the peripheral edges of members 10 and 12. This binds and seals members 10 and 12 together and holds inlet and outlet fittings 16 and 17 in place.

The heat exchanger and the unique method of making it find particular and novel utility when the encapsulation takes place in forming a wall of a container. This will be seen from the drawing wherein 20 represents an upright wall portion of a container, the bottom wall of which is shown in part at 21. The entire container is molded by a reaction injection molding (RIM) process using a suitable molding material. The molding material can be a two part polyurethane that is catalyzed, such as Mobay Baydur 726 made by Mobay Chemical Company or a catalyzed low pressure liquid. This is accomplished by placing the preassembled members 10 and 12, with the inlet and outlet fittings in place, in the bottom of the mold used in forming the container. The encapsulating material is then injected into the mold. In forming the bottom of the container, the material surrounds the flat edge portions 11 and 14, flowing through holes 15, and leaving the upper surface of the channel portion of member 12 exposed to the interior of the container, so as to be in heat exchange relation with the contents of the container.

When the chemical reaction or polymerization has occurred in the molding material, the container walls will have been formed and members 10 and 12 bound and sealed together around their entire edge portions as part of the bottom wall of the container. The upper surface of the channel forming portion of member 12 remains exposed to the interior of the container.

It should be noted that the remote end 25 of members 10, 12 is duplicated at the end nearer the viewer in the drawing, while the near end part has been cut away to show the cross section. The encapsulation extends around the entire periphery of members 10 and 12.

The heat exchanger has particular utility in photographic processing apparatus, as a means for maintaining a desired temperature in a solution tank, for example, in apparatus as shown in U.S. Pat. No. 4,994,840 to Hall et al, issued Feb. 19, 1991. A heating or cooling fluid is passed into inlet 16 whence it flows through channel 13 in heat exchange relation through member 12 with liquid (not shown) in the container, and then exits through outlet 17.

While the invention has been described in the form of a straight exchanger, it could be curved and the channel could be proportionally larger than shown. Also, the invention can be used to form conduits that replace pipes or tubing in a processor, for example, and thus, is not limited in use to a heat exchanger.

The invention has been described with reference to a preferred form of the apparatus and methods. However, it will be appreciated that variations and modifications can be effected without departing from the scope of the invention as defined in the appended claims.

We claim:

1. A heat exchanger comprising:

a first sheet member of elongated peripheral configuration having flat edge portions, a second member of heat transmitting sheet material having substantially the same elongated peripheral configuration as said first member, said second member having an elongated concavity forming a channel and having flat portions extending along both sides and ends of said channel, said flat portions of said second member being in face to face contact around the periphery of said channel with said flat edge portions of said first member, said channel facing toward said first member and forming a conduit with said first member, said portions of both said members having aligned, spaced openings, and plastic material encapsulating said facing edge portions and extending through said openings to bind and seal said members together.

2. A heat exchanger as set forth in claim 1, wherein both said members are of sheet metal.

3. A heat exchanger as set forth in claim 1, further comprising:

inlet and outlet fittings extending through respective end portions of said first member into said channel.

4. A heat exchanger as set forth in claim 3, further comprising:

said encapsulating material comprising a wall portion of a container, a surface of the channel forming portion of said second member being exposed to the interior of said container.

5. A conduit comprising:

first and second members having an elongated concavity forming a channel and having flat portions extending along both sides and ends of said channel, said flat portions of said members being in face to face contact around the periphery of said channel, said channels facing each other, said edge portions of both said members having aligned, spaced openings, and plastic material encapsulating said facing edge portions and extending through said openings to bind and seal said members together.

6. A method of forming a conduit, such as in a heat exchanger, the method comprising:

placing in face to face contact flat peripheral edge portions of two sheet members which form a channel and which have aligned openings spaced along the edge portions of both members, and encapsulating said edge portions with a plastic material which extends around the edge portions and through said openings to bind and seal said members together.

7. The method set forth in claim 6, further comprising:

inserting tubular inlet and outlet elements into respective spaced apart portions of one of said members before encapsulation so that said elements are encapsulated with said members.

8. The method set forth in claim 6, further comprising:

performing said encapsulation in forming a wall of a container, wit the encapsulating material forming part of a wall of the container.

9. The method set forth in claim 8, further comprising:

said encapsulation being carried out by reaction injection molding process.

* * * * *